Oct. 8, 1957  S. R. SMITH, JR  2,809,350
FUSE TESTING METER
Filed Sept. 13, 1954
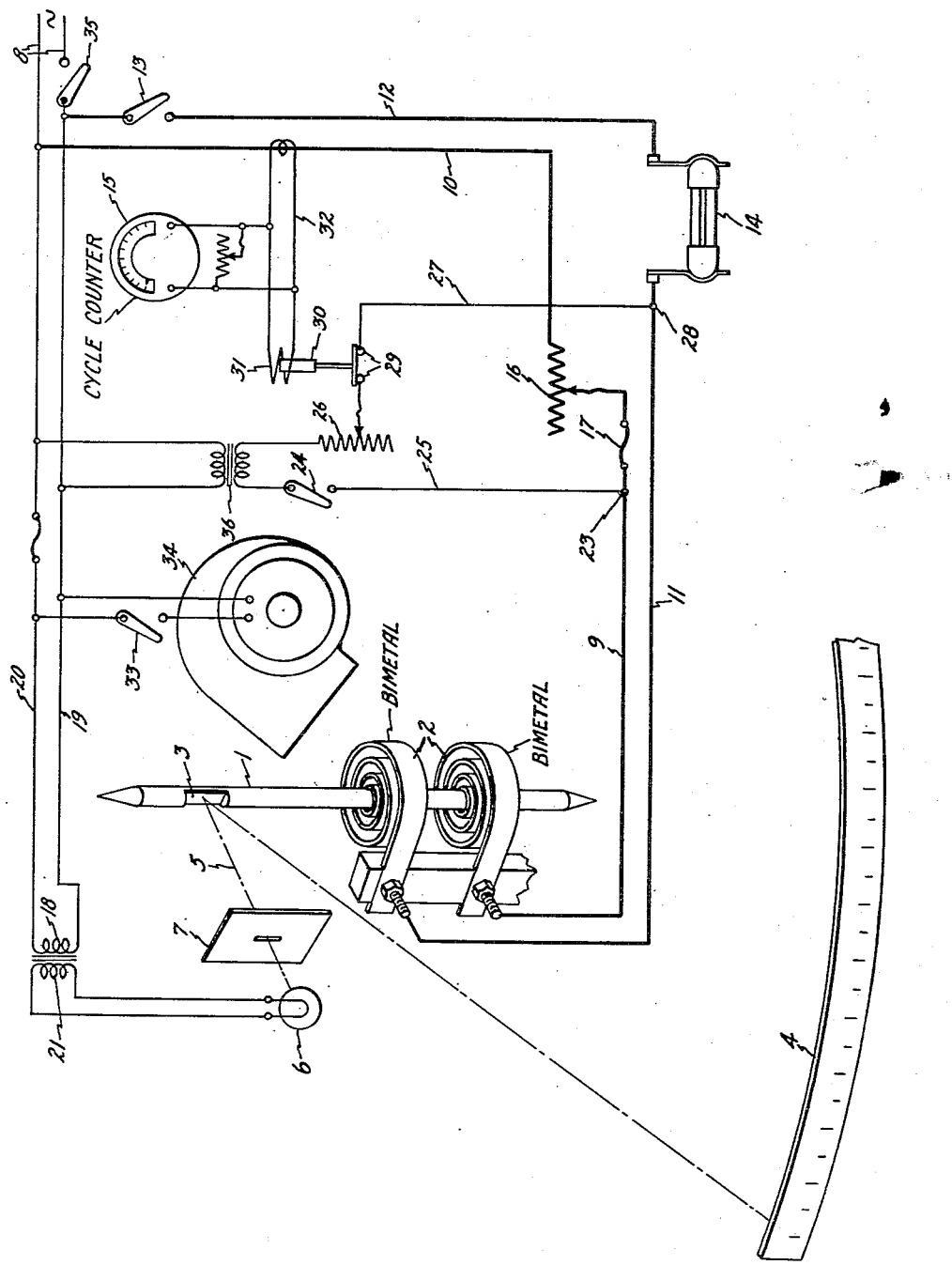
Inventor
Sidney R. Smith, Jr.
by Gilbert P. Tarleton
His Attorney.

United States Patent Office 2,809,350
Patented Oct. 8, 1957

2,809,350

FUSE TESTING METER

Sidney R. Smith, Jr., Stockbridge, Mass., assignor to General Electric Company, a corporation of New York Application September 13, 1954, Serial No. 455,459

6 Claims. (Cl. 324—158)

This invention relates to a meter and method for measuring the quantity amperes-squared times seconds of an electrical circuit, and more particularly, to a meter and method for testing electric fuses.

It is normal practice for manufacturers of fuses and fuse links to supply the users thereof with characteristic curves which show melting time versus current. To obtain this data for the long time portion of a conventional fuse is fairly simple. All that is needed is a current supply circuit, some sort of time measuring instrument, and an ampere meter to measure the current. To obtain data for the short time portion of the curves, for example from one second down to one-hundredth of a second is not so simple. The usual method in the past has been to use a magnetic oscillograph to record the current and time on a film. For each fuse link tested this requires developing and drying of films as well as tedious calculations to obtain the root-mean-square melting current.

It is an object of this invention to provide a low-cost, uncomplicated, reliable and accurate meter and method for measuring the quantity $I^2t$ of an electrical circuit.

It is a further object of this invention to provide a low cost, uncomplicated, reliable and accurate meter and method for measuring the quantity $I^2t$ required to melt a fuse.

My invention comprises a method of testing an electric fuse comprising passing electric current through said fuse until said fuse blows and simultaneously passing electric current which is proportional to said fuse current through a movable bimetallic element, and measuring the time required for said fuse current to blow said fuse and the amount of movement of said element during said time.

My invention further comprises a meter for totalizing the quantity amperes-squared times second of an electrical circuit during a transitent time interval as short as 1/75 second, said meter having a low intertia, low friction shaft rotatable proportional to heating which causes a continuous temperature rise of a heat storage element, said heat storage element having substantially no heat loss by radiation or conduction during said time interval and capable of being rapidly cooled during another short time interval subsequent to said first mentioned short time interval, said heat storage element heated proportional to said quantity amperes-squared times seconds of said electrical circuit, and means adapted to direct cool air against said heat storage element subsequent to said first mentioned short time interval.

My invention further comprises a meter adapted to totalize the quantity amperes-squared times seconds required to melt a fusible conductor during a time interval as short as 1/75 second, said meter having a shaft rotatable directly proportional to heating of a heat storage element, said heat storage element having substantially no heat loss by radiation or conduction during said time interval and capable of being rapidly cooled during another short time interval subsequent to said first mentioned short time interval, said heat storage element heated directly proportional to said quantity amperes-squared times seconds of said fusible conductor, said heat storage element comprising a spiral bimetal member surrounding said shaft, the inner end of said spiral bimetal member fixed to said shaft and the outer end of said spiral bimetal member fixed against movement, means for causing electrical current flow through said fusible conductor and through said spiral bimetal member directly proportional to said fusible conductor current, means for directing a stream of cool air against said spiral bimetal member subsequent to said first mentioned short time interval, a reflecting surface carried by said shaft, a dial, and a light beam reflected from said surface to said dial.

The features of my invention which I believe to be novel are set forth with particularity in the appended claims. My invention itself, however, both as to its organization and method of operation together with further objects and advantages thereof may best be understood by reference to the following description taken in connection with the accompanying drawing which is a diagrammatic illustration of the internal construction of a preferred form of my invention.

Referring now to the drawing, shown therein is a rotary axially fixed metallic shaft 1 adapted to be rotatably mounted at opposite ends thereof in suitable not shown electrically insulated substantially friction-free bearings. A pair of identical spiral bimetallic strips 2 surround shaft 1. The inner ends of the bimetallic strips 2 are connected to the shaft 1, and the outer end of the strips 2 are fixed against movement. The bimetallic strips 2 are closely axially spaced with respect to each other along the shaft 1 and are arranged to rotate the shaft 1 in unison in a like direction in response to heating thereof.

A small reflecting surface or mirror 3 is carried by the shaft 1 and movable simultaneously therewith. A dial 4 is calibrated into increments of $I^2t$ or some other suitable scale which can be translated into values of $I^2t$. A small light beam 5 generated from a light source 6 is by virtue of a heat insulating baffle 7 having a narrow slot therein directed against the reflecting surface 3 and reflected therefrom to the dial 4. The baffle plate 7 preferably is constructed out of heat insulating material so as to make the pair of bimetal strips 2 unaffected in their operation by the heat emitted from light bulb 6.

The pair of bimetal strips 2 are connected in electrical series circuit relationship with a source of alternating electrical energy 8 by virtue of lines 9 and 10 connected to the outer end of the lower bimetal strip 2 and lines 11 and 12 connected to the outer end of the upper bimetal strip 2. Line 12 has a manually operable switch 13 therein and means for receiving an electrical fuse 14 to be calibrated. Magnetically coupled to the line 10 and responsive to the flow of current therethrough is a timing mechanism or cycle counter 15 which can be calibrated to give direct time readings of the duration of current flow in line 10 or readings readily translatable into time values. Also, positioned in line 10 is a variable resistor 16 for adjusting current flow in line 10, and a protective fuse 17 for protecting the meter instrument from overcurrents and consequent damage.

When switches 13 and 35 are closed an identical current will flow through line 12, fuse 14, line 11, upper bimetal strip 2, and through the portion of shaft 1 disposed between the axially spaced pair of bimetal strips 2 to the lower bimetal strip 2, thence through line 9, fuse 17, resistor 16, and line 10. Also, the instant switches 13 and 35 are closed, the cycle counter 15 commences to operate. With the bimetal strips 2 being heated by the flow of current therethrough, the shaft 1 will rotate thereby causing the reflected light beam 5 to traverse dial 4. After the fuse 14 has carried a sufficient quantity of current for a sufficient time to cause rupture thereof, the electrical series circuit for the bimetal strips 2 will be interrupted at which instant a maximum time reading can be obtained from the dial of cycle counter 15 and a maximum $I^2t$ reading can be obtained from the dial 4. By adjusting the variable resistor 16 for different currents and similarly testing an identical batch of fuses, a complete plot of current versus melting time characteristics can be conveniently obtained for said batch of fuses on the short time as well as the long time portion of said curve with a minimum of calculations.

By using bimetal strips 2 the actuating elements of my meter are made uncomplicated, low cost, reliable, and accurate. Practically all the electrical energy input into the bimetal strips 2 is stored in the form of heat because the time element is relatively short and does not allow appreciable heat losses by radiation or conduction from the bimetals. In other words, the heat generated in the bimetals 2 equals the heat stored in the bimetals. This can be expressed by the equation:

$$I^2rt = m \times h \times (T_2 - T_1)$$

$m$ = bimetal mass
$h$ = bimetal specific heat
$r$ = bimetal resistance
$I$ = current flow through bimetal and calibrated fuse
$T_1$ = bimetal starting temperature
$T_2$ = bimetal final temperature
$t$ = time of current flow through bimetal and calibrated fuse Thus, $$I^2t = \frac{m \times h}{r}(T_2 - T_1)$$

For this bimetal arrangement the angular deflection $D = k(T_2 - T_1)$ where $k$ equals a constant for a particular bimetal size and material composition. Thus, $$I^2t = \frac{m \times h}{r \times k}D$$

Since $m$, $h$, $k$, and $r$ are all substantially constant for a particular bimetal, $I^2t = KD$. In other words, the metal shaft 1 will rotate through an angle proportional to $I^2t$ flowing in the circuit.

The deflection of the light beam 5 is also proportional to $I^2t$ but the light beam will have twice the angular deflection of the shaft 1. Such doubled angular deflection of the light beam enables amplification of the graduated dial 4. In some prior art instruments, the rotatable shaft thereof is burdened and complicated by pointers or the like connected thereto and movable therewith. Such mechanical arrangements do not always result in a highly sensitive and accurate instrument. In my invention friction and inertia are kept to a minimum by resorting to the use of a reflected light beam for indicating purposes.

Furthermore, my invention provides a means for totalizing the $I^2t$ input to an electrical circuit. This is true even though the time involved is short, for example less than one second. When the electrical circuit is closed, an identical current flows through both the bimetals 2 and the fuse link 14 eventually melting the fuse link. The light beam 5 reflected on to the dial 4 gives a reading on the instrument proportional to the total $I^2t$ energy required to melt the fuse 14. This $I^2t$ value is divided by $t$ (melting time of the fuse 14 as determined by the cycle counter 15). The square root of this resulting value is the effective current required to melt the fuse 14 during the time $t$. These two values will give one point on a current versus time fuse link melting curve. By adjusting the circuit for a variety of currents, a number of points can be obtained to plot a continuous current versus time fuse link melting curve.

The dial 4 can be conveniently calibrated by replacing the fuse 14 with an ampere meter. By closing the switches 13 and 35 for different time intervals and adjusting the variable resistor 16 for different currents, the whole dial 4 can be accurately calibrated even at its zero end. For each switch closing operation $t$ will be recorded at timer 15, I will be recorded at the ampere meter, and the light beam will move along the dial 4 to a maximum point proportional to $I^2t$. The dial 4 can be calibrated directly into $I^2t$ by multiplying the square of the ampere meter reading with the timer mechanism 15 reading and assigning said product to said maximum point. However, if so desired, the graduations on dial 4 can be assigned arbitrary values which in turn can be translated into $I^2t$ values from a graph having said arbitrary values plotted against the $I^2t$ values corresponding thereto.

Since the bimetals 2 start cooling immediately at the end of a given test, it may be desirable to have means whereby the light beam 5 can be held stationary at its maximum reading at the end of a test to aid in reading the instrument accurately. Automatically operable electrical means for holding the reflected light beam stationary at its maximum reading will now be described. It will be noted that the primary winding 18 of an insulating transformer is connected by lines 19 and 20 to the source of alternating electrical energy 8. The secondary winding 21 of said transformer supplies electrical energy to light bulb 6. The primary leads of another insulating transformer 36 are connected to lines 19 and 20. One of the secondary winding leads 25 of transformer 36, having a manually operable switch 24 therein, is connected to the junction 23 of lines 9 and 10. The other secondary winding lead of transformer 36 has a variable resistor element 26 therein. A line 27 connected at the lower end thereof to the junction 28 of lines 11 and 12 and having a pair of spaced switch contacts 29 therein is adapted to be adjustably connected at the upper end thereof to the variable resistor element 26 along the length thereof. The pair of spaced switch contacts 29 are adapted to be closed by a relay coil operated switch contact member 30 actuated by a relay coil 31 disposed in the circuit loop 32 which magnetically couples the cycle counter 15 to line 10.

In conducting a test, switches 13 and 24 are closed first and then switch 35 is closed. Closing of switch 35 results in current flow through line 10, energization of relay coil 31 and immediate opening of line 27. When fuse 14 blows, current flow in line 10 ceases at which time relay coil 31 is de-energized and line 27 closed. The tap of the upper end of line 27 along variable resistor element 26 is adjusted so that the energy input into the bimetals 2 after blowing of fuse 14 approximately equals the rate of heat loss from the bimetals 2 by radiation and conduction whereby the shaft 1 and reflected light beam will be retained at its maximum position. In some prior art meter mechanisms, a finger on the shaft moves an independent pointer to a maximum position and the parts are so arranged whereby when the finger returns to its zero position, the pointer will not move therewith but remain at its maximum position. Such mechanical arrangements increase the friction and inertia of the shaft. In my invention, the electrical means for holding the light beam stationary does not increase the friction and inertia of shaft 1 to be overcome by the actuating element 2.

After the maximum $I^2t$ reading is obtained, switch 24 is opened and a switch 33 controlling a blower 34 connected to the source of electrical energy 8 is closed. The blower 34 directs a stream of cool air between the turns of the bimetals and against the bimetals to rapidly return them to their initial starting position so that another test can be conducted with a minimum of delay. Without the blower 34, the meter would be less practical since it would take too long for the bimetals 2 to cool and to return to zero after conducting a test.

In the illustrated preferred form of my invention, the heat storage element or bimetals 2 are capable of accurately totalizing the quantity amperes-squared times seconds of the fusible conductor 14 since the bimetals 2 have substantially no heat loss by radiation or conduction during a short test time interval, and are capable of being rapidly cooled during another short time interval subsequent to said short test time interval. Preferably the bimetals 2 are spiral in configuration whereby the outer turns of the spirals insulate the inner turns against heat loss. It is within the scope of my invention to use only a single spiral bimetal as the heat storage element. However, using a pair of closely spaced bimetal spirals 2 has the advantage in that the opposite facing sides of the pair of spiral bimetals being at the same temperature effectively insulate each other so far as heat loss by radiation is concerned. That is, with a pair of spiral bimetals the proportion of heat loss, if any, during a short test time interval is less than where only a single bimetal spiral is used.

Also, when the pair of spiral bimetals 2 are used the shaft 1 is unencumbered inasmuch as the leads 9 and 11 can be connected to the outer ends of the bimetals 2. If only a single bimetal 2 were used either lead 9 or 11 would have to be connected to the inner end of said single bimetal or the shaft 1. Such a mechanical arrangement not only complicates the structure but also ordinarily tends to increase the friction and inertia of the shaft 1.

A good heat storage element usually requires added insulation whereby the insulated heat storage element cannot be cooled quickly subsequent to a test. In my invention, the heat storage elements 2 due to their configuration and arrangement with respect to each other tend to be self-insulating. However, the heat storage elements 2 can also be rapidly returned to zero after a test since they are bare and have no added insulation. As illustrated in the drawing, the blower 34 is positioned so that a stream of cool air can be directed between the inner turns of the bimetals as well as against the outer turns for effective rapid cooling.

The bimetals 2 have a relatively small thickness and mass and a relatively high activity constant or deflection rate per ampere of current whereby the shaft 1 will be deflected during test intervals as short as $\frac{1}{75}$ second. The turns of the bimetal spirals are wound close with respect to each other to minimize radiation or conduction heat loss, care being exercised not to wind the turns so close as to increase friction and inertia or cause a short circuit between turns. Conventional fuse link melting curves are customarily plotted for the time range of 0.8 of the first cycle of a 60-cycle alternating current and upward. For the short time portion of a fuse link melting current vs. melting time curve the fuse link may melt within a very short test time interval, say within $\frac{1}{75}$ to 1 second. With 60 cycle alternating current an ammeter will not accurately record the melting current, if at all, if the fuse link melts within say 0.8 to 60 cycles of alternating current. This is because it takes about 1 second for an ammeter to overcome the inertia of its own parts. Also, if a deflection is obtained on an ammeter within such a short time interval, it is uncertain whether the ammeter reading is a root-mean-square current value or a crest current value. Additionally, for a test time interval as short as $\frac{1}{75}$ to 1 second or 0.8 to 60 cycles the current will vary due to changing resistance characteristics of the fuse link during heating and melting thereof. These problems could be overcome in part by using direct current. However, for the short time portions of fuse link melting current vs. melting time curves high currents are required to melt the fuse links, and to obtain non-fluctuating constant high direct currents is rather expensive.

In my invention, the aforementioned problems are avoided in an inexpensive, uncomplicated, and reliable manner. Since the shaft 1 is substantially friction and inertia free, it is accurately rotatable directly proportional to heating of the heat storage element 2. Since the heat storage element 2 has a high activity constant and substantially no heat loss by radiation or conduction during a test time interval as short as $\frac{1}{75}$ second and as long as three seconds, it is accurately heated directly proportional to the quantity amperes-squared times seconds required to melt the fusible conductor 14. In the current ranges herein concerned with during a short test time interval of $\frac{1}{75}$ to 3 seconds, the temperature of bimetals 2 rises continuously to a maximum temperature within said short test time interval. Said maximum temperature is not so great with respect to the ambient temperature as to cause any substantial heat loss from the bimetals 2 by radiation or conduction during said short test time interval. Also, since the heat storage element 2 has no added insulation, it can be rapidly cooled subsequent to said test time interval by the blower 34.

While there has been shown and described a particular embodiment of the invention, it will be obvious to those skilled in the art that changes and modifications may be made without departing from the invention, and it is intended by the appended claims to cover all such changes and modifications as fall within the true spirit and scope of the invention.

What I claim as new and desire to secure by Letters Patent of the United States is:

1. An $I^2t$ meter for calibrating fuses comprising an axially fixed rotary metallic shaft, a pair of identical spiral bimetallic strips surrounding said shaft in axially spaced relationship, the inner ends of said strips fixed to said shaft and the outer ends of said strips fixed against movement, each of said strips arranged to rotate said shaft in unison in a like direction when heated in response to a flow of an electrical current therethrough, means for causing the flow of an identical electrical current through each of said strips, means for connecting a fuse to be calibrated in electrical series circuit relationship with at least one of said strips, a reflecting surface carried by said shaft, an $I^2t$ calibrated dial, a light reflected from said surface to said dial, and a blower for cooling said strips subsequent to rupture of said fuse.

2. A meter for plotting current versus fusing time characteristics of electrical fuses comprising an axially fixed rotary metallic shaft, a pair of identical spiral bimetallic strips surrounding said shaft in axially spaced relationship, the inner ends of said strips fixed to said shaft and the outer ends of said strips fixed against movement, each of said strips arranged to rotate said shaft in union in a same direction when heated in response to the flow of an electrical current therethrough, a small reflecting surface carried by said shaft, an $I^2t$ calibrated dial, and a small light beam reflected from said surface to said dial; said strips, the portion of said shaft between said strips, an electrical fuse to be calibrated, a switch, and a source of electrical energy connected in electrical series circuit relationship; and a timer mechanism indicative of the time elapsed between closing of said switch and rupture of said fuse.

3. An $I^2t$ meter for plotting fusing current versus fusing time curves of electrical fuses comprising a rotary axially fixed shaft, a pair of identical axially spaced spiral bimetallic strips surrounding said shaft, the inner ends of said strips connected to said shaft and the outer ends of said strips being stationary, said strips adapted to rotate said shaft in unison in a same direction in response to heating thereof, a small reflecting surface carried by said shaft, a calibrated dial translatable into values of $I^2t$, a small light beam reflected from said surface to said dial, means for simultaneously causing the flow of an identical electrical current through each of said strips and an electrical fuse to be calibrated, automatically operable means indicative of the time elapse during said electrical fuse current flow, automatically operable electrical means adapted to retain said reflected light beam at its maximum dial reading at the instant of rupture of said electrical fuse, and a blower for cooling said strips subsequent to said fuse rupture.

4. A meter for calibrating fuses comprising a lengthwise immovable rotary shaft having a spiral bimetallic strip surrounding said shaft, the inner end of said strip connected to said shaft and the outer end of said strip fixed against movement, a fuse to be calibrated connected in electrical series circuit relationship with said strip whereby said strip will cause rotation of said shaft in proportion to the product of the square of current flow through said fuse and the time duration of said current flow, a reflecting surface carried by said shaft, a graduated scale, and a small light beam reflected from said surface to said scale, automatically operable means for measuring said time duration, and a blower for directing a stream of cool air against said strip subsequent to rupture of said fuse.

5. A meter for calibrating fuses comprising a lengthwise immovable rotary shaft having a spiral bimetallic strip surrounding said shaft, the inner end of said strip connected to said shaft and the outer end of said strip fixed against movement, a fuse to be calibrated connected in electrical series circuit relationship with said strip whereby said strip will cause rotation of said shaft in proportion to the product of the square of current flow through said fuse and the time duration of said current flow, a small reflecting surface carried by said shaft, a graduated scale, a small light beam reflected from said surface to said scale, automatically operable electrical means for measuring said time duration, and electrical means operative subsequent to rupture of said fuse for adding electrical energy to said strip at a rate equal to the rate of heat loss from said strip.

6. A meter for calibrating fuses comprising a lengthwise immovable rotary shaft having a spiral bimetallic strip concentrically disposed with respect thereto, the inner end of said strip connected to said shaft and the outer end of said strip immovably fixed, a fuse to be calibrated and a source of alternating electrical energy connected in an electrical series circuit with said strip wherein when said circuit is closed the heat energy generated in said strip will be directly proportional to the electrical energy necessary to rupture said fuse whereby said strip will cause rotation of said shaft in direct proportion to said necessary electrical energy, a small reflecting surface carried by said shaft, a small light beam reflected from said surface to a scale, an automatically operable mechanism for measuring the time duration of current flow in said fuse, electrical means automatically operable subsequent to rupture of said fuse for generating additional heat energy in said strip at a rate equal to the rate of heat energy loss therefrom, and a blower for directing a stream of cool air against said strip to return said strip to an unheated condition.

References Cited in the file of this patent
UNITED STATES PATENTS

| | | |
|---|---|---|
| 2,385,044 | Vassar | Sept. 18, 1945 |
| 2,469,115 | Jagersberger | May 3, 1949 |